United States Patent
Ogoro

[11] Patent Number: 6,011,963
[45] Date of Patent: Jan. 4, 2000

[54] RECEIVED SIGNAL STRENGTH DETECTING CIRCUIT

[75] Inventor: Kazuo Ogoro, Tokyo, Japan

[73] Assignee: NEC Corporation, Tokyo, Japan

[21] Appl. No.: 08/902,279

[22] Filed: Jul. 29, 1997

[30] Foreign Application Priority Data

Aug. 1, 1996 [JP] Japan .................................. 8-203624

[51] Int. Cl.[7] .............................................. H04B 17/00
[52] U.S. Cl. ..................................... 455/226.2; 455/226.4
[58] Field of Search ........................... 455/200.1, 226.1,
455/226.2, 226.3, 226.4, 250.1, 303, 304,
315, 245.1, 254.1

[56] References Cited

U.S. PATENT DOCUMENTS 5,701,601  12/1997  Tomoe et al. ........................ 455/226.2
5,745,521   4/1998  Sugita ................................. 455/226.4

FOREIGN PATENT DOCUMENTS 0 059 415   9/1982  European Pat. Off. .
4-56529     2/1992  Japan .
2 262 690   6/1993  United Kingdom .

*Primary Examiner*—Thanh Cong Le
*Attorney, Agent, or Firm*—Scully, Scott, Murphy & Presser

[57] ABSTRACT

A received input signal 10 is received by a reception circuit 20 and a modulator 21, and demodulated data 12 and a reception level signal 16 are obtained. A modulator 23 reconstitutes a modulated wave 13 from the demodulated data 12, and an amplitude detector 21 detects the amplitude of the modulated wave, thus taking out amplitude level variations of the received wave due to modulation components. An analog subtractor 27 cancels the amplitude level variation component with respect to the reception level signal of the received wave. With the cancellation of the amplitude level variations of the received wave due to modulation components, it is possible to follow up quick amplitude level variation of the received wave.

8 Claims, 6 Drawing Sheets

RECEIVED SIGNAL STRENGTH DETECTING CIRCUIT

BACKGROUND OF THE INVENTION

The present invention relates to a received signal strength detecting circuit and, more particularly, to a received signal strength detecting circuit which permits response time reduction.

A received signal strength detecting circuit (or an RSSI circuit) is used in a receiver for accurately detecting-the received signal strength (or reception level).

FIG. 6 is a block diagram showing a prior art received signal strength detecting circuit. A received input signal 100 is converted in a reception circuit 200 into a received IF signal 110 and then demodulated in a demodulator 210 to obtain demodulated data 120.

The reception circuit 200 also outputs a reception level signal 160 representing the amplitude level of the received input signal 100. This reception level signal 160 is usually outputted from an IF amplifier in the reception circuit 200.

In an FM modulation system, the received level signal 160 has a constant value. In a modulation system in which the amplitude is variable, such as an AM or a PSK modulation system, however, the signal 160 has a variable amplitude level component in dependence on the modulation content. In order to obtain an RSSI signal 180 which is proportional to the level of the received input signal 100 regardless of the modulation content, therefore, the reception level signal 160 should be smoothed through an LPF 220. As a result of this smoothing, the variable amplitude level component which is dependent on the modulation content, is averaged, and a value independent of the modulation content can be obtained. This type of receiver is described in, for instance, Japanese Laid-Open Patent Publication No. 4-56529.

The LPF 220 is an inevitable element for suppressing variations of the reception level due to amplitude level variations. Japanese Laid-Open Patent Publication No. 3-291027, for instance, discloses a technique of switching the time constant of the LPF to meet requirements in mobile communication systems.

However, as a result the passing of the reception level signal 160 through the LPF 220, the output RSSI signal 180 has a dull waveform. In the prior art, therefore, quick amplitude level variations of the received input signal 100 can not be followed up.

In order to be able to follow up the level variations of the received input signal 100, it is conceived to reduce the extent of dulling of the waveform by reducing the time constant of the LPF 220. W the extent of duling of the waveform is reduced, however, the variable amplitude level component due to the modulation is no longer ignorable, resulting in such an error as the introduction of the variable amplitude level component in the RSSI signal 180.

In addition, the LPF 220 slows down the response of the received level signal, in the prior art the rise time of the reception circuit from the instant of the power source connection can not be reduced. In order for the reception level to be sufficiently converged in a necessary timing when the receiving circuit is turned on, the power source for the reception circuit should be connected at an earlier timing.

FIG. 7 shows waveforms involved when the power source is connected for intermittent signal reception. In a system in which signal is received intermittently such as waiting reception frequently used in recent mobile communication, the use of the above long rise time reception circuit results in a large "on" time ratio to the full time, and makes it impossible to reduce the average current consumption.

SUMMARY OF THE INVENTION

An object of the present invention is therefore to provide a received signal strength detecting circuit, which cancels amplitude level variations of a received wave due to modulation components by reconstituting a modulated wave.

In the present invention, a modulated wave is reconstituted from the demodulated data, and its amplitude is detected to detect amplitude level variations of the received wave due to modulation components. The detected amplitude level variations are cancelled with respect to a reception level signal obtained from the received wave. The amplitude level variations of the received wave due to modulation components thus can be cancelled to obtain the intrinsic amplitude level of the received input signal without use of any low-pass filter. It is thus possible to follow up quick amplitude level variations of the received wave.

In more specifically, according to an aspect of the present invention, there is provided a received signal strength detecting circuit for outputting a reception level signal in which a received modulation signal is demodulated, the demodulated signal is modulated, and the amplitude data of the modulated signal is subtracted from the received signal.

According to another aspect of the present invention, there is provided a received signal strength detecting circuit comprising: a demodulator for demodulating a received signal; a modulator for reconstituting a modulated wave by modulating the demodulated data; an amplitude detector for detecting the amplitude of the modulated wave and providing an amplitude signal; a logarithmic converter for converting the amplitude signal to match the scale thereof to the scale of the received signal; a delay circuit for delaying the received signal for a predetermined time; and a subtractor for taking the difference between the amplitude signal and the delayed received signal.

According to other aspect of the present invention, there is provided a received signal strength detecting circuit comprising: a demodulator for demodulating a received signal; a modulator for reconstituting a modulated wave by modulating the demodulated data; a waveform means for outputting a digital waveform signal of the modulated wave; D/A converter for converting the digital waveform into an analog signal; a low pass filter for attenuating unnecessary harmonic components of the output of the D/A converter; an amplitude detector for detecting the amplitude of the output of the low pass filter signal; a logarithmic converter for converting the amplitude signal to match the scale thereof to the scale of the received signal; a delay circuit for delaying the received signal for a predetermined time; and a subtractor for taking the difference between the amplitude signal and the delayed received signal.

Other objects and features will be clarified from the following description with reference to attached drawings.

PREFERRED EMBODIMENTS OF THE INVENTION

Embodiments of the present invention will now be described with reference to the drawings.

Figure 1:
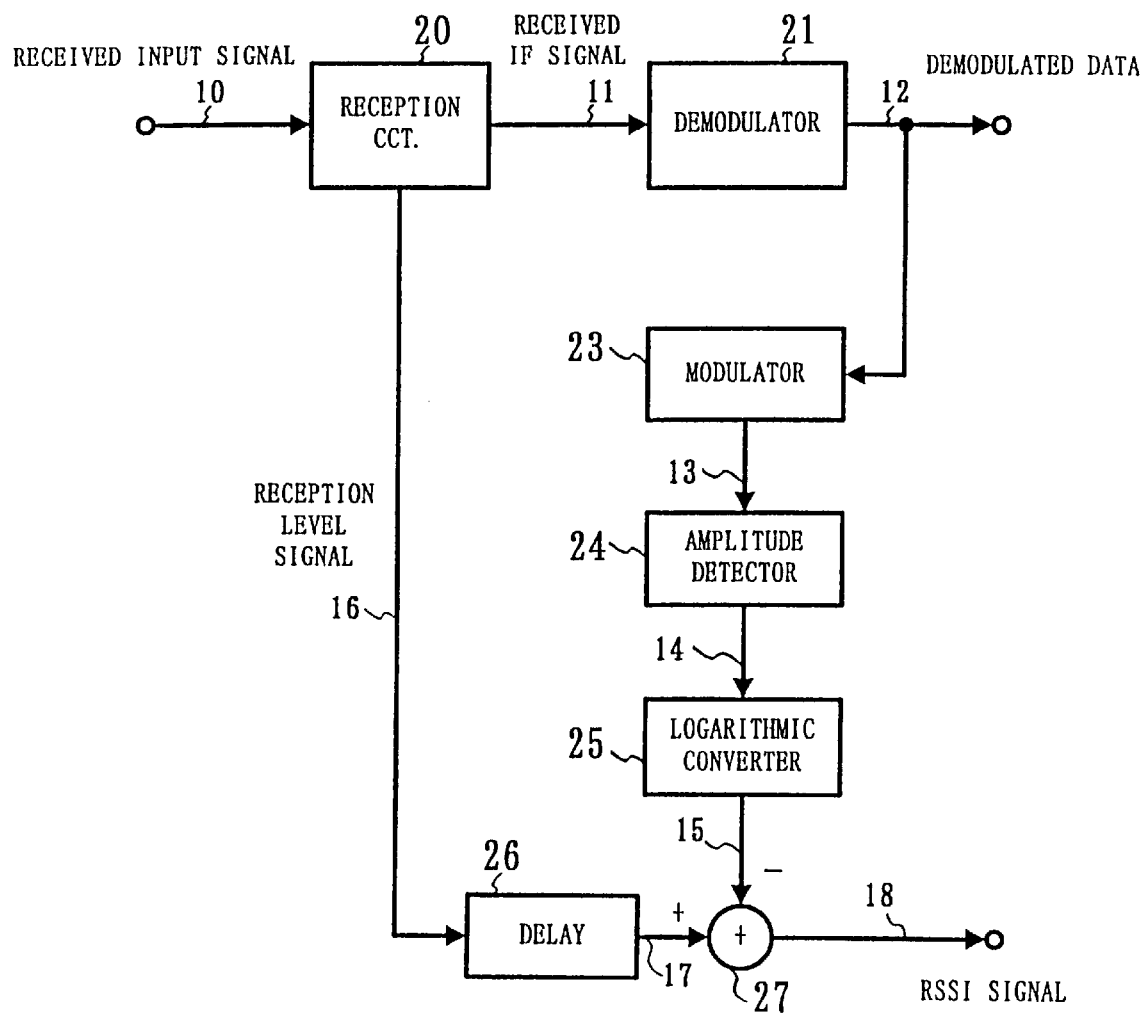
FIG. 1 shows a block diagram according to a first embodiment of the present invention.

Referring to FIG. 1, received input signal 10 is inputted to a reception circuit 20, which outputs a received IF signal 11 and a reception level signal 16. The received IF signal 11 is demodulated in a demodulator 21 to obtain demodulated data 12.

The demodulated data 12 is used as the output of the receiver, and is also inputted to a modulator 23, which thus outputs a modulated signal 13. The modulated signal 13 is inputted to an amplitude detector 24, which thus outputs an amplitude signal 14. The amplitude signal 14 is inputted to a logarithmic converter 25, which thus outputs a logarithmic amplitude signal 15.

The reception level signal 16 outputted from the reception circuit 20 is inputted to an analog delay circuit 26, which thus outputs a delayed reception level signal 17. The logarithmic amplitude signal 15 and the delayed reception level signal 17 are inputted to an analog subtractor 27 to obtain an RSSI signal 18.

The operation of the embodiment of the present invention shown in FIG. 1 will now be described in detail with reference to the waveform chart of FIG. 2.

The reception circuit 20 which receives the received input signal 10, includes a usual superheterodyne receiver IF amplifier.

The IF amplifier in the reception circuit 20 sufficiently amplifies the received IF signal 11 up to a level necessary in the succeeding stage demodulator 21 and outputs the reception level signal 16 representing the amplitude level of the received IF signal 11. The voltage of the received level signal 16 is usually proportional to the logarithm of the received input signal level, that is, it is linearly proportional to the received input signal level in the decibel display.

Figure 2:
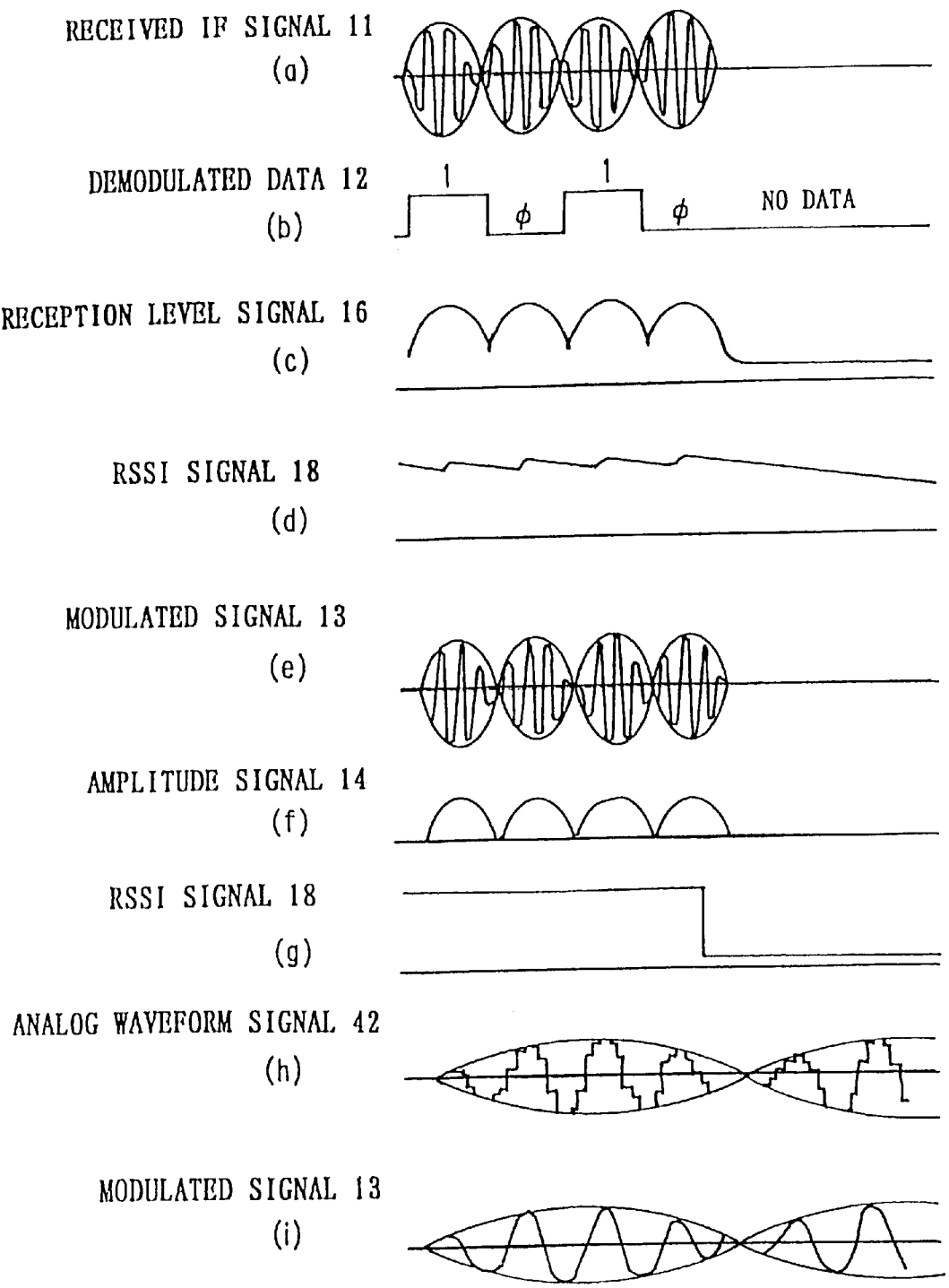
FIG. 2 shows waveform examples based on the assumption of a 2-phase PSK signal.

An example of the waveform of the received IF signal 11 is as shown in (a) of FIG. 2, and an example of the waveform of the reception level signal 16 is shown in (c) of FIG. 2. The waveform examples shown in FIG. 2 are all based on the assumption of a 2-phase PSK signal. However, the same operation is obtainable with other PSK signals or with AM modulation.

The demodulator 21 demodulates the received IF signal 11, which is an AM or a PSK signal used in the pertinent system, and outputs the demodulated data 12. An waveform example of the demodulated data 12 is shown in (b) of FIG. 2. This example concerns with a PSK signal and a digital modulation system, and the demodulated data is obviously independent of the reception level. However, an analog modulation system such as an AM modulation system as well, the reception circuit 20 has an AGC function, and the demodulated data does not contain any component dependent on the reception level since it was the received IF signal 11.

The demodulated data 12, while being used as the output of the receiver, is inputted to the modulator 23 for generating the modulated signal 13. The modulated signal 13 which is generated from the demodulated data 12 independent of the reception level, is also independent of the level of the received input signal 10, and is thus a signal at a constant level dependent on the sole demodulated data. A waveform example of the modulated signal 13 is shown in (e) of FIG. 2.

The amplitude detector 24 detects the amplitude of the modulated signal 13, which is the same as the usual IF signal (but at a desired frequency), and outputs the amplitude signal 14 as amplitude data. This signal is obtainable by envelope detecting the modulated signal 13. A waveform example of this signal is shown in (f) of FIG. 2.

The amplitude signal 14 is a signal linearly proportional to the amplitude of the modulated signal 13, while the reception level signal 16 outputted from the reception circuit 20 is a signal proportional to the logarithm of the amplitude of the received input signal 10. Therefore, the scales of these two signals are, therefore, not compatible. Accordingly, the amplitude signal 14 is inputted to the logarithmic converter 25 to obtain the logarithmic amplitude signal 15.

The desired signal can be obtained by taking the difference between the reception level signal 16 and the logarithmic amplitude signal 15. However, the logarithmic amplitude signal 15 is delayed because its original signal has passed through a number of circuits. To time the two signals to each other, the analog delay circuit 26 which provides a delay time corresponding to the above delay of the logarithmic amplitude signal 15 is inserted on the side of the reception level signal 16. Of course the analog delay circuit 26 is unnecessary in a system where the delay gives rise to no problem.

The analog delay circuit 26 delays the reception level signal 16 to output the delayed reception level signal 17. The analog subtractor 27 takes the difference between the delayed reception level signal 17 and the logarithmic amplitude signal 15 and thus outputs the final RSSI signal 18 as shown in (g) of FIG. 2.

Figure 6:
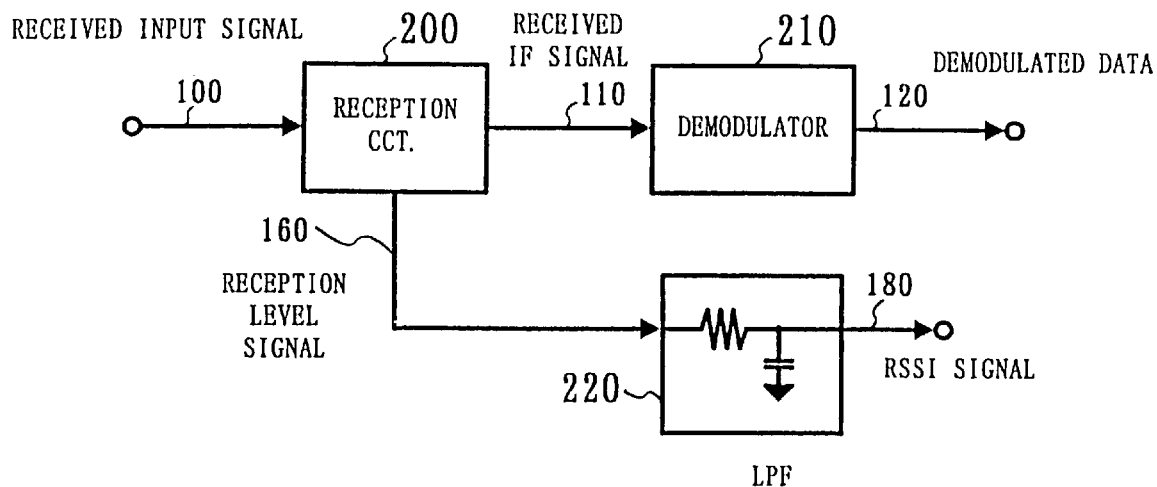
FIG. 6 is a block diagram showing a prior art received signal strength detecting circuit.
Figure 7:
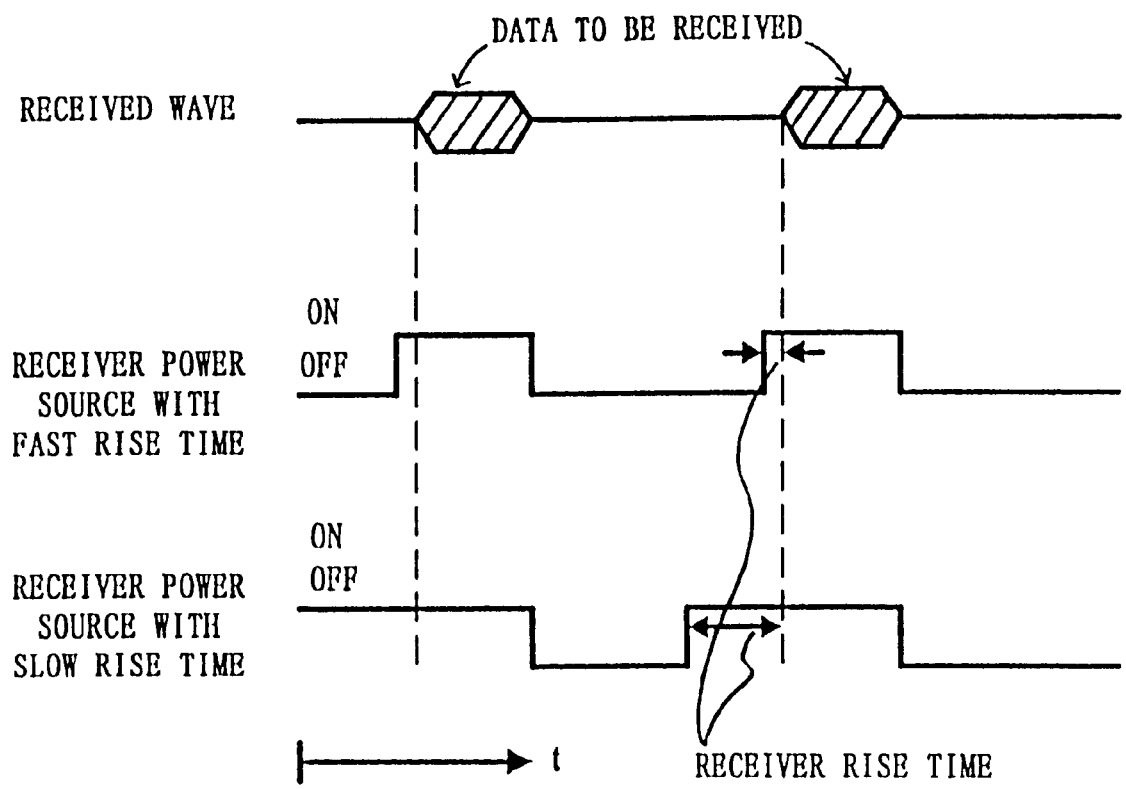
FIG. 7 shows waveforms involved when the power source is connected for intermittent signal reception.

The circuit construction as described is free from a time constant circuit such as the first LPF 220 shown in FIG. 6, and the individual signals thus can quickly respond to amplitude level variations of the received wave.

Figure 3:
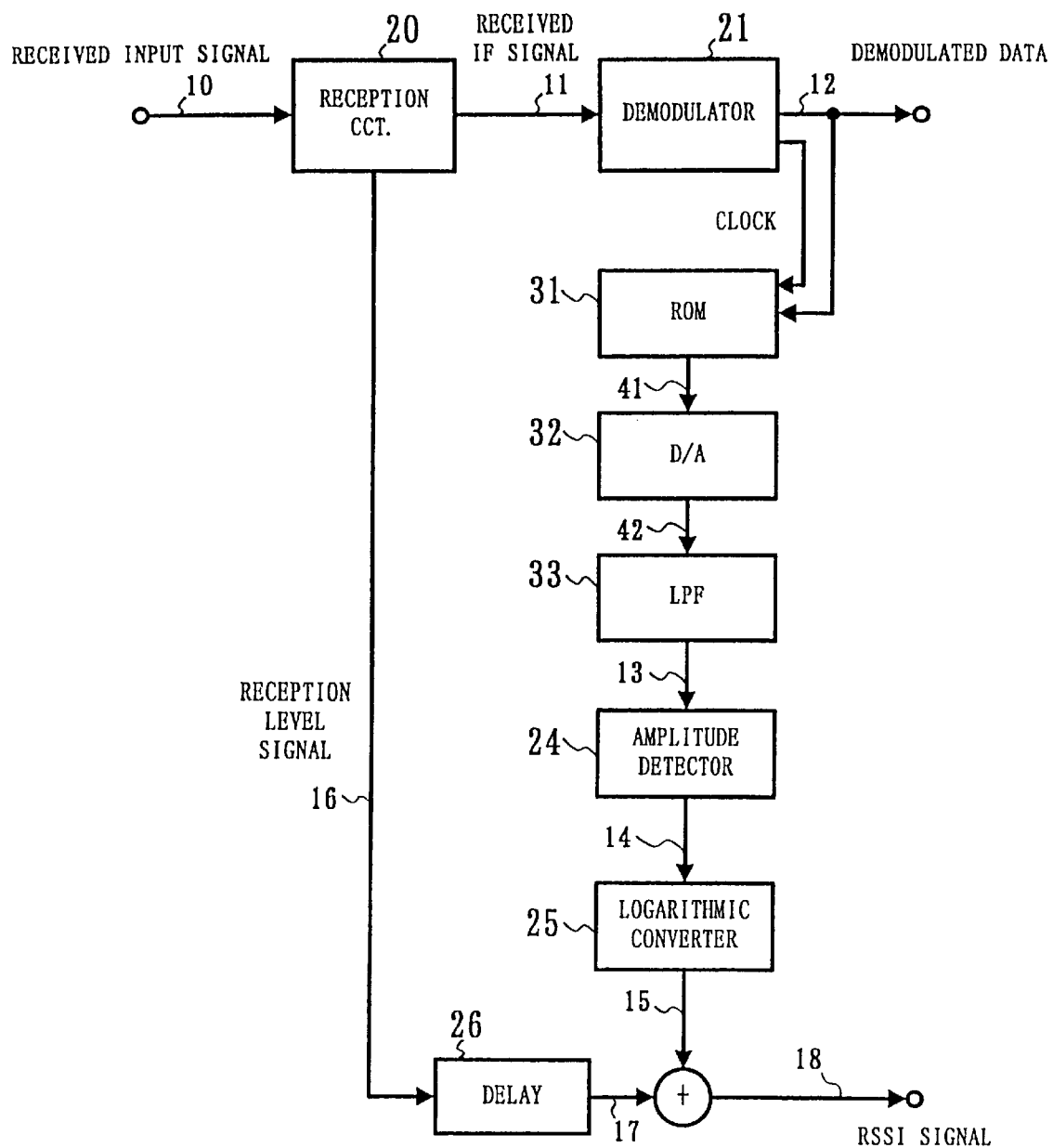
FIG. 3 shows a block diagram according to a second embodiment of the present invention.

A second embodiment of the present invention will now be described with reference to FIG. 3.

Referring to the figure, this embodiment is obtained by replacing the modulator 23 shown in FIG. 1 with other means for providing digital modulation, i.e., a ROM 31, a D/A converter 32 and an LPF 33.

The demodulated data 12 and a demodulated clock from the demodulator 21, while being used as the receiver output, are inputted to the ROM 31. The ROM 31 outputs a digital waveform signal 41 of the modulated wave according to its input data. The digital waveform signal 41 corresponds to the result of high rate sampling of the analog waveform, and has a waveform as shown in (h) of FIG. 2 as digital data.

The ROM which generates the digital waveform signal 41 is not a prerequisite element. For example, where a waveform is given as a function in advance, the digital waveform can be directly computed with a digital signal processor (DSP). As a further alternative, the digital waveform signal 41 may be realized in a hardware fashion with a universal digital circuit. The signal 41 is immediately converted in a D/A converter 32 into an analog signal, i.e., an analog waveform signal 42 as shown in (h) of FIG. 2.

The analog waveform signal 42 obtained as a result of the D/A converter has a staircase-like waveform and has many harmonics. Therefore, it is passed through a low-pass filter 33 to attenuate unnecessary harmonic components and obtain a modulated signal 13 as shown in (i) of FIG. 2.

The operation subsequent to the generation of the modulated signal 13 is the same as in the first embodiment. In this embodiment, the ROM and D/A converter are used in lieu of the modulator as analog circuit to provide the same function, and the embodiment thus permits LSI.

A third embodiment will now be described with reference to FIG. 4.

While in the preceding second embodiment the waveform is stored in the ROM, the data stored therein may not be the modulated wave itself. For example, the amplitude detector 24 may be realized with an absolute value circuit for changing the sign of the negative part of the waveform. This means that the amplitude detector 24 may be dispensed with by using data for providing an amplitude detection waveform from the outset. Likewise, for the logarithmic conversion the logarithmic converter 25 may be dispensed with by logarithmical converting the ROM data in advance.

The third embodiment is obtained under the above concept.

Figure 4:
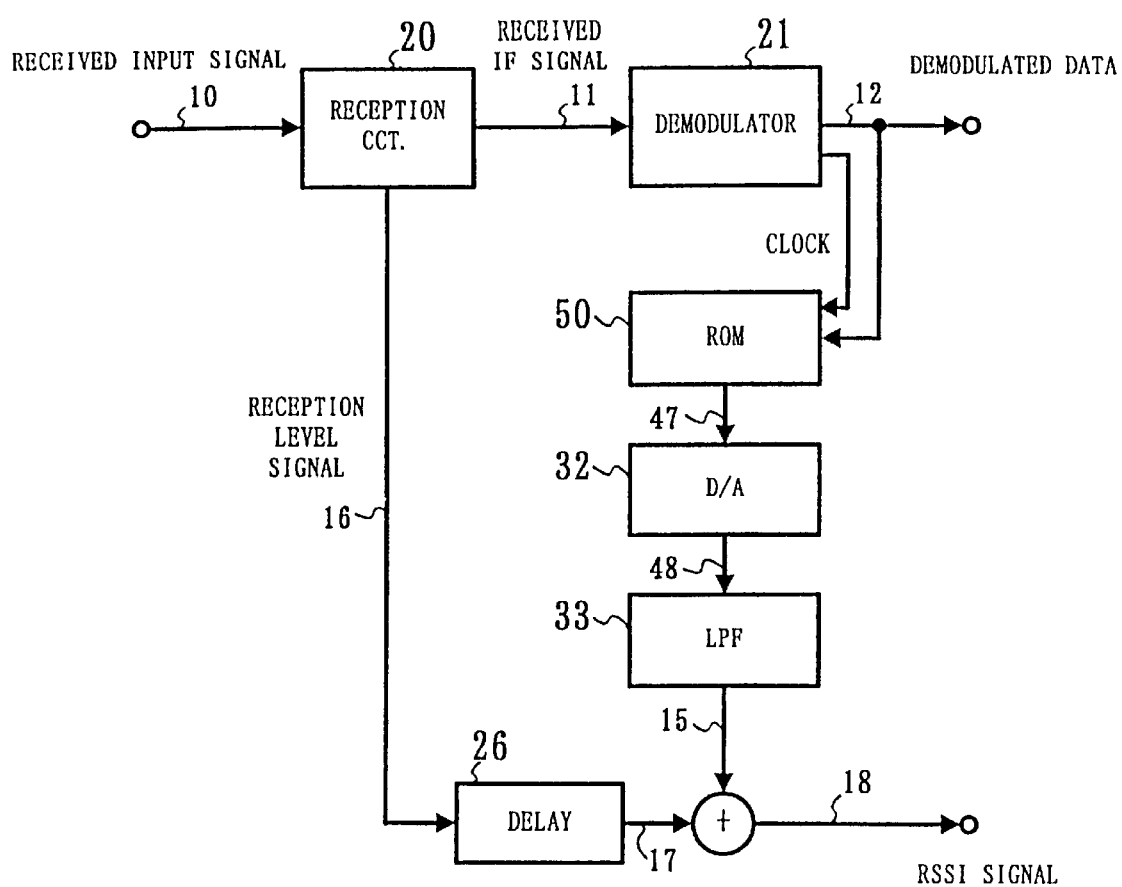
FIG. 4 shows a block diagram according to a third embodiment of the present invention.

FIG. 4 shows the third embodiment. Referring to the figure, the demodulated data 12 from the demodulator 21, while being used as the receiver output, is inputted to a ROM 50. To the ROM 50, a demodulated data and the demodulated clock are supplied from the demodulator 21. On the basis of the demodulated clock the amplitude of demodulated data is logarithmically converted by the ROM 50. Thus converted data 47 is converted in the D/A converter 32 into an analog signal, i.e., an analog signal 48 representing the amplitude of the modulated wave.

The modulated wave amplitude analog signal 48 obtained as a result of the D/A conversion, is a staircase-like waveform and has many harmonics. Therefore, it is passed through a second low-pass filter 33 to attenuate unnecessary harmonic components and obtain the logarithmic amplitude signal 15.

The operation subsequent generation for the logarithmic amplitude signal 15 is the same as in the second embodiment. In this embodiment, the functions of the amplitude detector and the logarithmic converter are included in the ROM data. It is thus possible to considerably simplify the circuit and also construct the circuit as a digital system. Thus, the circuit which has heretofore been constructed as an analog circuit can be readily obtained by LSI, thus permitting size and weight reduction of the system compared to the first embodiment.

Figure 5:
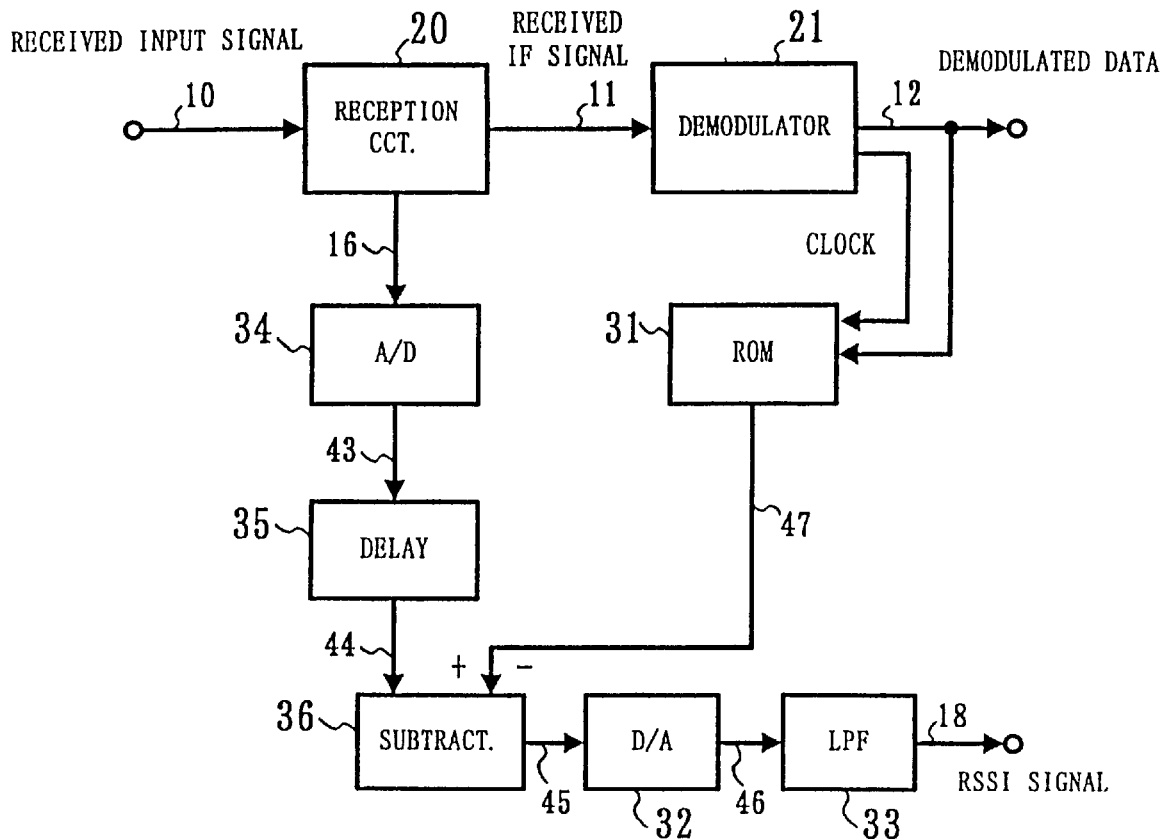
FIG. 5 shows a block diagram according to a fourth embodiment of the present invention.

FIG. 5 is a block diagram showing a fourth embodiment.

In the preceding third embodiment the ROM data was converted into the analog signal before the subtraction. However, by digitally converting the reception level signal 16 from the reception circuit 20, the subtraction may also be executed in a digital circuit. This embodiment is based on this concept.

Referring to FIG. 5, the demodulated data 12 from the demodulator 21, while being used as the receiver output, is inputted to the ROM 31 together with the demodulated clock. The ROM 31 outputs a modulated wave amplitude digital signal 47, which is obtained through logarithmic conversion of the amplitude of a modulated wave corresponding to the input data.

In the meantime, the reception level signal 16 outputted from the reception circuit 20 is converted in an A/D converter 34 into a digital signal 43 representing the amplitude level of the received wave. The digital signal 43 is passed through a delay circuit 35 for compensating the delay in the demodulator 21, thus obtaining a delayed digital signal 44.

A delay circuit for delaying an analog signal is relatively difficult to be realized. The delay circuit 35, however, delays the digital signal, and thus it can be readily constructed by using, for instance, a shift register.

The delayed digital signal 44 and the modulated wave amplitude digital signal 47 are both digital signals and are supplied to a digital subtractor 36 to take their difference and obtain a digital RSSI signal 45. The digital RSSI signal 45 is immediately converted in the D/A converter 32 into an analog RSSI signal 46, which is passed through the low-pass filter 33 to suppress unnecessary harmonic components, thus obtaining the RSSI signal 18.

In the construction as described, all portions for processing the RSSI signal may be constructed as digital circuits, and thus the embodiment can be readily obtained by LSI.

Recently, communication systems are increasing, in which an RSSI signal obtained from a reception circuit is A/D converted into digital data, which is utilized by being read out by a microcomputer section of a controller. In such a case, it is not necessary to convert the digital RSSI signal 45 into the analog signal, and the D/A converter 32 and the second low-pass filter 33 are unnecessary.

As has been described in the foregoing, according to the present invention by reconstituting a modulated wave from demodulated data obtained in the receiver, detecting the amplitude of the modulated wave, detecting the amplitude level variations of the received wave due to modulation components, and cancelling the amplitude level variations with respect to the reception level signal of the received wave, it is possible to cancel the amplitude level variations of the received wave due to the modulation components without use of any low-pass filter, and the RSSI signal thus can follow up quick amplitude level variations of the received wave. In addition, since the rise time of the receiver can be reduced, it is possible to alleviate current power consumption particularly in an intermittently operable signal receiving system.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A received signal strength detecting circuit for outputting a reception level signal in which a received modulation signal is demodulated, the demodulated signal is modulated, and the amplitude data of the modulated signal is subtracted from the received signal.

2. The received signal strength detecting circuit according to claim 1, the amplitude data of the modulated signal is logarithmically converted to produce the data to be subtracted.

3. The received signal strength detecting circuit according to claim 1, the received signal is delayed for a predetermined time and outputted as the received signal.

4. The received signal strength detecting circuit according to claim 1, wherein waveform of the modulated wave is produced from the demodulated data.

5. The received signal strength detecting circuit according to claim 1, wherein waveform of the modulated wave is preliminarily stored in a ROM and read out on the basis of the demodulated data.

6. A received signal strength detecting circuit comprising:

a demodulator for demodulating a received signal;

a modulator for reconstituting a modulated wave by modulating the demodulated data;

an amplitude detector for detecting the amplitude of the modulated wave and providing an amplitude signal;

a logarithmic converter for converting the amplitude signal to match the scale thereof to the scale of the received signal;

a delay circuit for delaying the received signal for a predetermined time; and a subtractor for taking the difference between the amplitude signal and the delayed received signal.

7. A received signal strength detecting circuit comprising:

a demodulator for demodulating a received signal;

a modulator for reconstituting a modulated wave by modulating the demodulated data;

a waveform means for outputting a digital waveform signal of the modulated wave;

D/A converter for converting the digital waveform into an analog signal;

a low pass filter for attenuating unnecessary harmonic components of the output of the D/A converter;

an amplitude detector for detecting the amplitude of the output of the low pass filter signal;

a logarithmic converter for converting the amplitude signal to match the scale thereof to the scale of the received signal;

a delay circuit for delaying the received signal for a predetermined time; and a subtractor for taking the difference between the amplitude signal and the delayed received signal.

8. The received signal strength detecting circuit according to claim 7, wherein the waveform means is ROM.

* * * * *